United States Patent [19]

Michael

[11] 4,429,593
[45] Feb. 7, 1984

[54] FULL RANGE HYDROMECHANICAL TRANSMISSION

[75] Inventor: Richard A. Michael, Waterloo, Iowa

[73] Assignee: Deere & Company, Moline, Ill.

[21] Appl. No.: 172,364

[22] Filed: Jul. 25, 1980

[51] Int. Cl.³ ............... F16H 47/04; F16H 37/06; F16H 57/10
[52] U.S. Cl. .................................. 74/687; 74/681; 74/760
[58] Field of Search ............ 74/687, 688, 689, 690, 74/760, 761, 681

[56] References Cited

U.S. PATENT DOCUMENTS

| | | | |
|---|---|---|---|
| Re. 27,307 | 3/1972 | De Lalio | 74/687 |
| 2,697,367 | 12/1954 | Winther | 74/761 |
| 2,959,984 | 11/1960 | Wilkman | 74/688 |
| 3,188,885 | 6/1965 | Fisher | 74/761 |
| 3,306,129 | 2/1967 | De Lalio | 74/687 |
| 3,427,899 | 2/1969 | Gunderson et al. | 74/687 |
| 3,433,095 | 3/1969 | Tuck | 74/687 |
| 3,479,908 | 11/1969 | Kress et al. | 74/681 |
| 3,534,632 | 10/1970 | Smith | 74/687 |
| 3,580,107 | 5/1971 | Orshansky, Jr. | 74/687 |
| 3,626,787 | 12/1971 | Singer | 74/687 |
| 3,714,845 | 2/1973 | Mooney, Jr. | 74/687 |
| 3,736,813 | 6/1973 | Kress et al. | 74/740 |
| 4,261,226 | 4/1981 | Orshansky, Jr. | 74/687 |
| 4,306,467 | 12/1981 | Pollman | 74/687 |

Primary Examiner—Allan D. Herrmann
Assistant Examiner—Stephen B. Andrews

[57] ABSTRACT

An improved full range hydromechanical transmission is disclosed which is designed to be connected to a driven input member, such as a drive shaft of an engine. The transmission combines a hydrostatic drive unit with mechanical gearing in the form of a compound planetary gear set to obtain a full range, infinitely variable hydromechanical transmission. This hydromechanical transmission is especially applicable for use in agricultural and industrial type tractors.

15 Claims, 5 Drawing Figures

FIG. 5
| SPEED RANGE | TRANSMISSION ELEMENTS ENGAGED | | | |
|---|---|---|---|---|
| | $C_1$ | $C_2$ | $B_1$ | $B_2$ |
| CREEPER-F | X | | | |
| WORKING | X | | X | |
| TRANSPORT | | X | | |
| NEUTRAL | | | | |
| CREEPER-R | | | X | |
| REVERSE | | | | X |
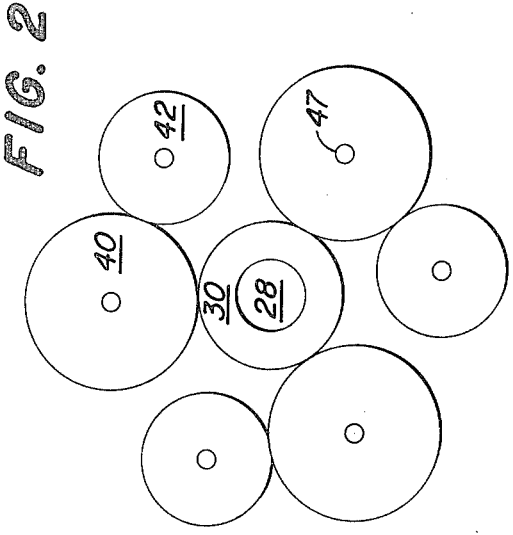
FIG. 2
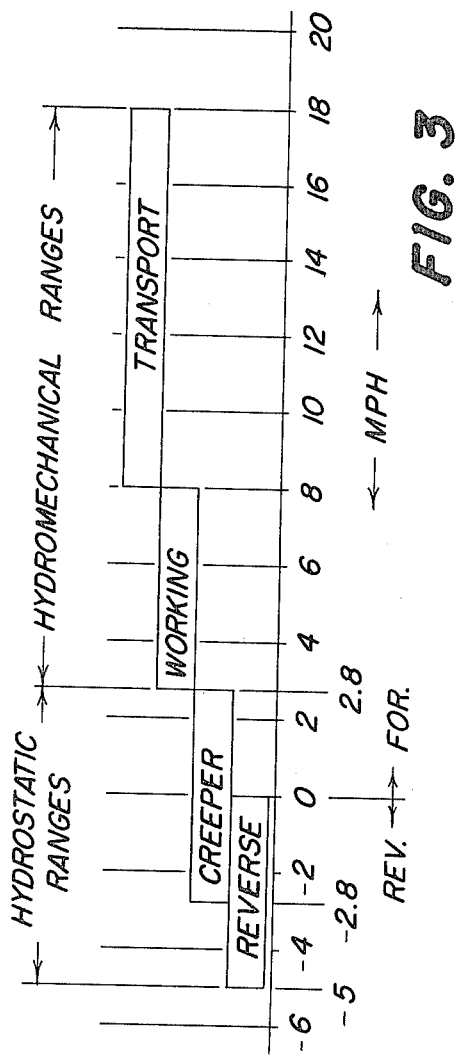
FIG. 3
SPEED RANGES OF HYDROMECHANICAL TRANS.

FULL RANGE HYDROMECHANICAL TRANSMISSION

BACKGROUND OF THE INVENTION

1. Field of the Invention

This invention relates to an improved full range hydromechanical transmission and more particularly to an improved full range hydromechanical transmission for agricultural and industrial type tractors.

2. Description of the Prior Art

Hydromechanical transmissions are transmissions which combine mechanical gearing with a hydrostatic arrangement. Although mechanical transmissions are generally more efficient and reliable than pure hydrostatic transmission, they have the disadvantage of not being infinitely variable as are the more expensive hydrostatic transmissions. Likewise, the hydrostatic transmissions have a major disadvantage in that they generally require larger components, such as larger pumps and motors, as the transmission increases in maximum capacity.

In order to satisfy space limitations, reduce cost, increase efficiency and provide an infinitely variable speed transmission which is capable of supplying power over a full spectrum of forward and reverse speeds, transmission designers have combined the best features of both transmissions and have built the so-called hydromechanical transmission. However, each hydromechanical transmission has been designed for a particular purpose and their use as a tractor transmission is somewhat limited.

Three relevant U.S. patents on hydromechanical transmissions include U.S. Pat. No. 3,534,632, issued to Smith in 1970; U.S. Pat. No. Re. 27,307, issued to DeLalio in 1972; and U.S. Pat. No. 3,736,813, issued to Kress et al in 1973. All three patents differ from the present invention in at least one noticeable way. Specifically, the Smith transmission utilizes a plurality of gear sets to provide a synchronous speed shifting transmission. The present invention simplifies the mechanical gearing by using only one compound planetary. The second patent, issued to DeLalio, claims a transmission having a full hydrostatic low range and a hydromechanical high range. Such a transmission is unsatisfactory for applications in tractors because the major working speeds on a tractor are in the range of about 3–7.5 mph. This range would correspond to a range of output/input ratios of about 0.25–0.56 rpm, most of which would be in the inefficient full hydrostatic operating range. Lastly, the Kress patent is a limited range variable speed transmission utilizing a collar shifted portion to extend the limited ranges. The present invention eliminates the necessity of having such a collar shift portion.

SUMMARY OF THE INVENTION

Briefly, this invention relates to an improved full range hydromechanical transmission. This hydromechanical transmission, designed to be connected to a driven input member, comprises a reversible variable speed hydrostatic drive unit having a variable displacment section and a bi-directional or reversible section, a compound planetary gear set and multiple clutches and brakes. The hydrostatic drive unit is connected to and driven by the driven input member.

The compound planetary gear set, which is rearwardly located with respect to the hydrostatic drive unit, provides the mechanical gearing portion of this transmission. This compound planetary gear set includes three sun gears denoted as a first sun gear, a second sun gear and a third sun gear. The first sun gear is driven by the hydrostatic drive unit. Orbiting about these three sun gears are first and second sets of cluster gears, with each set including three cluster gears. Each of the three cluster gears of the first set has a first planet gear and a second planet gear. This first planet gear meshes with the first sun gear and the second planet gear meshes with the second sun gear. Each of the three cluster gears of the second set also has two planet gears referred to as a third planet gear and a fourth planet gear. Each of the fourth planet gears meshes with one of the first planet gears and the third planet gear meshes with the third sun gear.

The compound planetary gear set also includes a ring gear which encircles and meshes with the third planet gears. A rotatable carrier which supports the first and second sets of cluster gears is connected to an output member.

This improved full range hydromechanical transmission also utilizes two clutches and two brakes to selectively engage the various elements. The first clutch is engageable to connect the driven input member to the third sun gear while the second clutch is engageable to connect the driven input member to the second sun gear. The two brakes are likewise engageable in the following manner. The first brake is used to prevent rotation of the ring gear and the second brake is used to prevent rotation of the second sun gear.

The general object of this invention is to provide an improved full range hydromechanical transmission. A more specific object of this invention is to provide an improved full range hydromechanical transmission designed for use in agricultural and industrial type tractors.

Another object of this invention is to provide a more efficient and less costly full range hydromechanical transmission.

Still another object of this invention is to provide a full range hydromechanical transmission having three forward drive ranges and two reverse drive ranges.

A further object of this invention is to provide a full range, infinitely variable hydromechanical transmission with emphasis on high efficiency in the critical speed range of about 3–7.5 mph.

Other objects and advantages of the present invention will be more apparent from the following description and the drawings.

BRIEF DESCRIPTION OF THE DRAWINGS

FIG. 2 is a schematic view as seen along the line 2—2 of FIG. 1.

FIG. 3 is a chart showing the four speed ranges of the improved full range hydromechanical transmission.

FIG. 5 is a table showing the clutch and brake units which are engaged to achieve the various speed ranges.

DETAILED DESCRIPTION OF THE INVENTION

Figure 1:
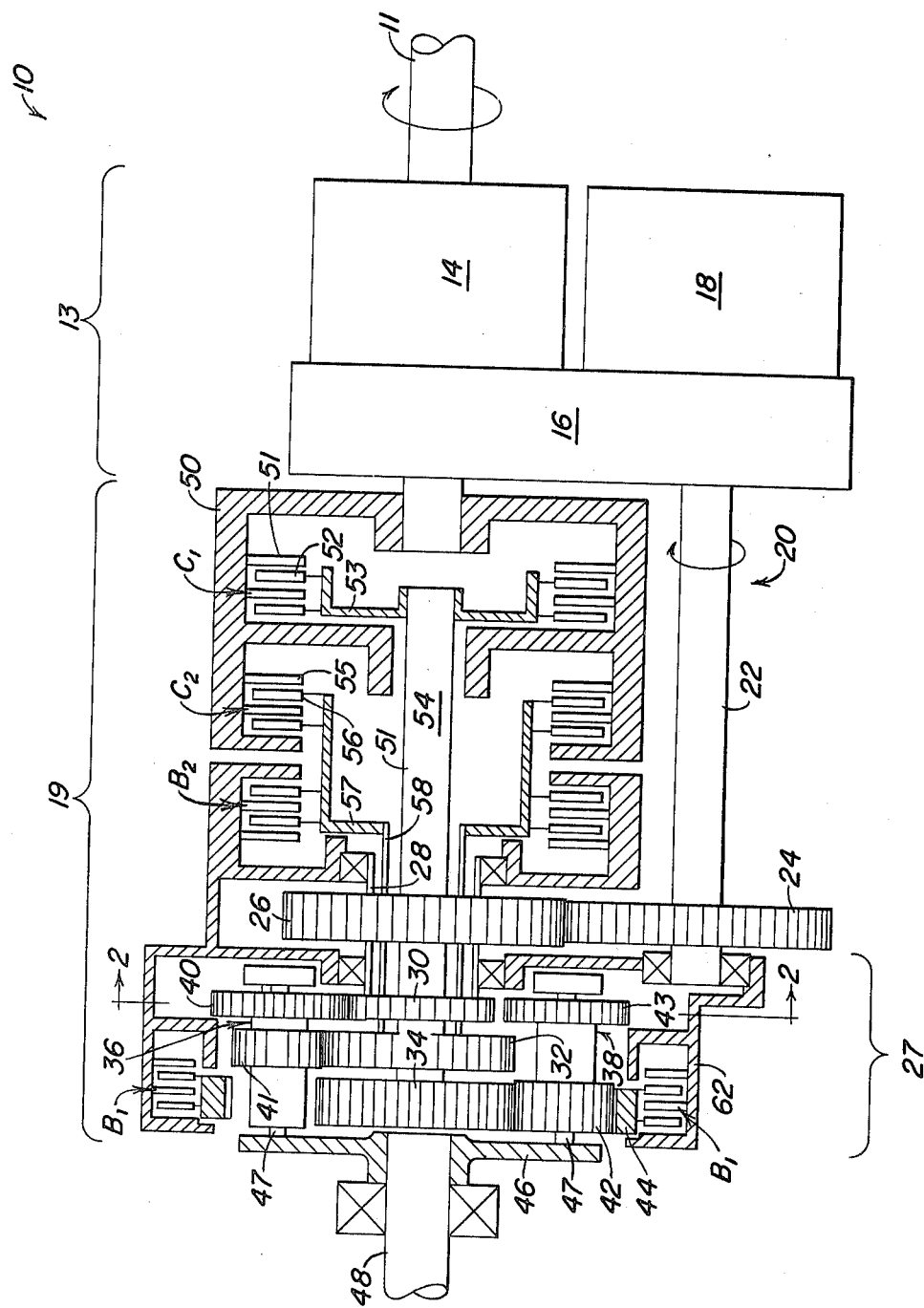
FIG. 1 is a sectional view of the improved full range hydromechanical transmission.

FIG. 1 shows an improved full range hydromechanical transmission 10 which is connected to a driven input member 11. Typically, the driven input member 11 is a drive shaft extending out from an internal combustion engine. The driven input member 11 extends rearwardly through a hydrostatic drive unit 13. The word "rearwardly" is used throughout this application to describe the disposition of the hydromechanical transmission 10 in a vehicle with respect to the vehicle's engine. However, it should be realized that this language is used only for purposes of convenience and not by way of limitation.

The hydrostatic drive unit 13 contains a variable displacement drive section 14, manifold means 16 and a bi-directional or reversible driven section 18. Preferably, the variable displacement drive section 14 is an axial piston pump haing a swash plate movable to opposite sides of a neutral position, and the bi-directional driven section 18 is preferably a fixed displacement unit, such as a motor, whose direction and speed of rotation will be controlled by the displacement of the drive section 14. The manifold means 16 interconnects the drive section 14 and the bi-directional driven section 18. This manifold means 16 provides passages for the circulation of a fluid in either direction between the two sections 14 and 18.

The bi-directional driven section 18 is joined to a mechanical gearing section 19 by a rotatable connecting means 20. This rotatable connecting means 20 is made up of a rearwardly extending auxiliary shaft 22 and a first gear 24 which is mounted thereon. This first gear 24 is preferably mounted on the left or rearward end of the auxiliary shaft 22 and meshes with a second gear 26. This second gear 26, in turn, is fixedly mounted on a first hollow rotatable shaft 28 which is aligned with the input member 11 and is also attached to a portion of a rearwardly positioned compound planetary gear set 27. The purpose of the connecting means 20 is to provide a pathway for transmitting the hydrostatic power to the mechanical gearing section 19.

The compound planetary 27 includes three rearwardly positioned and coaxially aligned sun gears including a first sun gear 30, a second sun gear 32 and a third sun gear 34. Arranged in an orbiting relationship about these three sun gears 30, 32 and 34 are first and second sets of cluster gears 36 and 38, respectively. Each of the first and second sets 36 and 38, respectively, contain three cluster gears arranged approximately 120° apart. Each cluster gear of the first set 36 is made up of a first planet gear 40 and a second planet gear 41. Each of the first planet gears 40 meshes with the first sun gear 30 and each of the second planet gears 41 meshes with the second sun gear 32. Preferably, the first and second planet gears 40 and 41, respectively, are of unequal diameters with the first planet gears 40 being larger than the second planet gears 41.

Each cluster gear of the second set 38 is made up of a third planet gear 42 and a fourth planet gear 43. Each of the fourth planet gears 43 meshes with one of the first planet gears 40 and each of the third planet gears 42 meshes with the third sun gear 34. Preferably, the third and fourth planet gears 42 and 43, respectively, are of unequal diameters with the fourth planet gear 43 being larger than the third planet gear 42.

The compound planetary gear set 27 further includes a ring gear 44 and a rotatable carrier 46. The ring gear 44 meshes with the third planet gears 42 and is in an encircling relationship to the rotatable carrier 46. The rotatable carrier 46 is used to support the first and second sets of cluster gears 36 and 38, respectively, by a plurality of pinion shafts 47, two of which are shown in FIG. 1.

Securely attached to and extending rearwardly from the rotatable carrier 46 is an output member 48. The output member 48, which is preferably a rotatable shaft, is normally connected to a drive shaft which transmits power to the rear wheels of a vehicle.

The hydromechanical transmission 10 further includes first and second clutches, $C_1$ and $C_2$, respectively, and first and second brakes, $B_1$ and $B_2$, respectively. The first clutch $C_1$ is housed in a rotatable clutch drum 50 which is positioned rearward of the hydrostatic unit 13. The rotatable clutch drum 50 is securely attached to the left end of the driven input member 11 which extends through the drive section 14 of the hydrostatic drive unit 13. The first clutch $C_1$ is a conventional clutch which includes a plurality of clutch plates 51 fastened to the inside surface of the clutch drum 50. These clutch plates 51 are arranged to frictionally contact a plurality of clutch disks 52. These clutch disks 52, in turn, are fastened to a first hub 53 which is mounted on the forward or right-hand end of a rotatable shaft 54. This rotatable shaft 54 extends through the hollow shaft 28 and has the third sun gear 34 affixed to its left or rearward end. By engaging the first clutch $C_1$, both the shaft 54 and the third sun gear 34 are forced to rotate at the same speed as the driven input member 11.

The second clutch $C_2$ is also housed in the rotatable clutch drum 50 but is positioned rearward of the first clutch $C_1$. This second clutch is a conventional clutch which includes a plurality of clutch plates 55 fastened to the inside surface of the clutch drum 50. These clutch plates 55 are arranged to frictionally contact a plurality of clutch disks 56. These clutch disks 56, in turn, are fastened to a second hub 57 which is mounted on the forward or right-hand end of a hollow rotatable shaft 58. Shaft 58 encircles the shaft 54 and also supports the second sun gear 32. By engaging the second clutch $C_2$, both the hollow shaft 58 and the second sun gear 32 are forced to rotate at the same speed as the driven input member 11.

The first and second clutches $C_1$ and $C_2$, respectively, are preferably of the wet type wherein a cooling lubricant is used to extract and dissipate the heat produced by the frictional contact between the clutch disk and the clutch plates. It should also be noted that the clutch drum 50 is depicted as a single member when, in fact, it may be constructed of several members integrally joined together.

The first brake $B_1$ is positioned relative to the compound planetary gear set 27 between a transmission housing 62 and the ring gear 44. This first brake $B_1$ is selectively engageable to prevent rotation of the ring gear 44. When engaged, the first brake $B_1$ will hold the ring gear 44 stationary and therefore serve as a reaction element for the second set of cluster gears 38. With the ring gear 44 held stationary, the second set of cluster gears 38 will roll around the ring gear 44 causing the rotatable carrier 46 to turn at a certain reduced speed.

The second brake $B_2$ is positioned rearward of the second clutch $C_2$ and lies between the transmission housing 62 and the second hub 57. This second brake $B_2$ is selectively engageable to prevent rotation of the second sun gear 32. When engaged, the second brake $B_2$ will hold the second hub 57 stationary and thereby prevent rotation of both the hollow rotatable shaft 58 and the second sun gear 32. With the second sun gear 32 held stationary, the first set of cluster gears 36 will orbit about the second sun gear 32 causing the rotatable carrier 46 to turn at a certain reverse speed.

Figure 4:
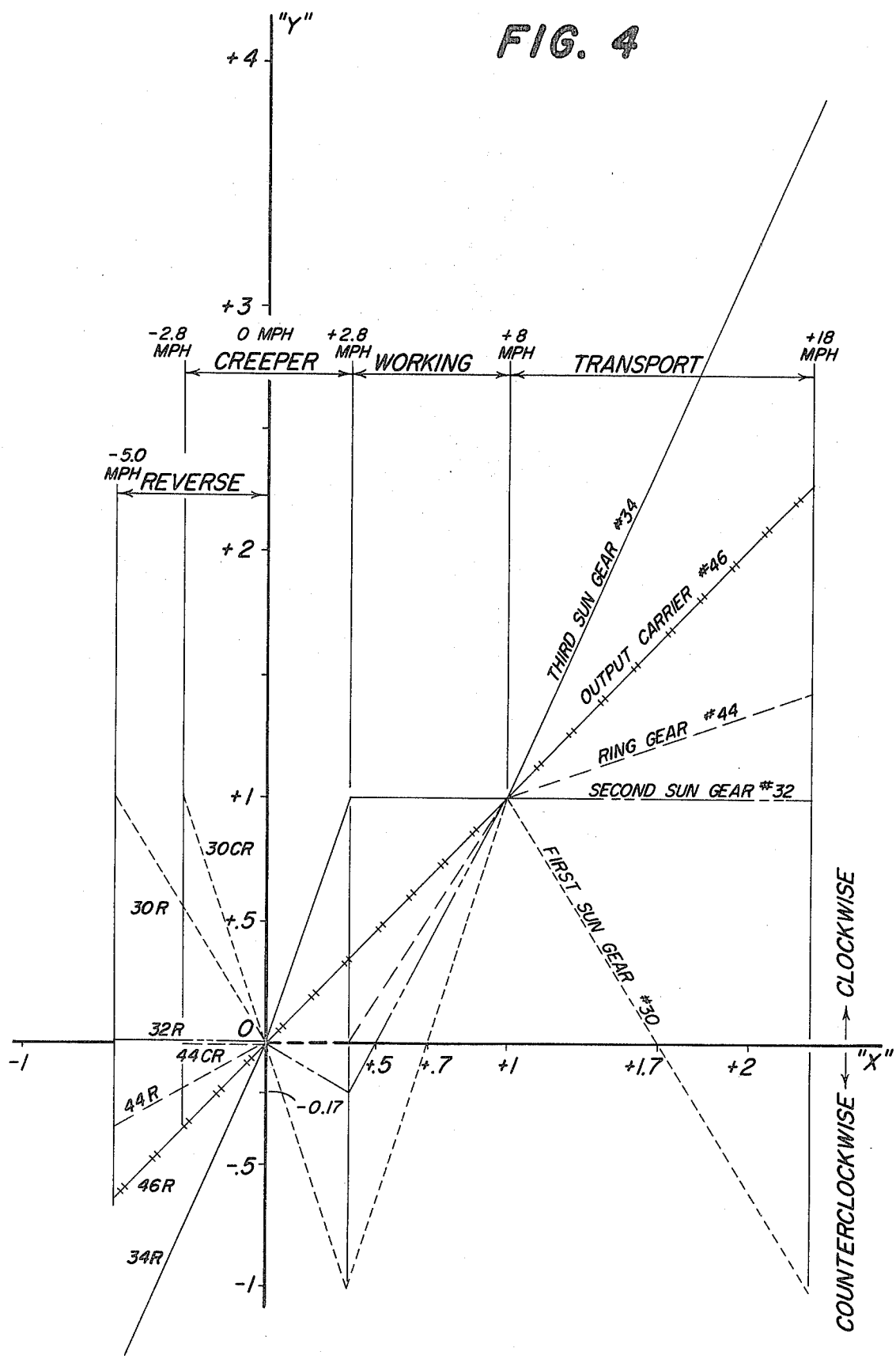
FIG. 4 is a chart showing the various speed ratios for the three sun gears, the rotatable carrier and the third planet ring gear.

Referring now to FIG. 3, the arrangement of the four hydrostatic and hydromechanical speed ranges are shown. These four speed ranges are represented as "reverse", "creeper", "working" and "transport". The creeper range is further subdivided into creeper-forward and creeper-reverse. The selective engagement of the various clutches and brakes to obtain these different speed ranges are depicted in FIG. 5, and the actual speed of the ring gear and the three sun gears is shown in FIG. 4. A discussion of the engagement of the various clutch and brake elements, together with the drive features of the hydromechanical transmission 10, will be explained below under the subheading "Operation".

All of the above-mentioned clutches and the brakes are engageable by conventional hydraulic actuators well known to those skilled in the transmission art. Therefore, such actuators, as well as the controls, will not be described in detail.

Operation

Referring to FIGS. 4 and 5, the hydromechanical transmission 10 is in neutral when the two clutches $C_1$ and $C_2$ and the two brakes $B_1$ and $B_2$ are disengaged. In this neutral position, the variable displacement drive section 14 is being rotated by the driven input member 11 but at zero displacement. For purposes of this discussion, it shall be assumed that the driven input member 11 is always rotating clockwise at a constant speed of approximately 2200 rpm when the engine is running. This constant speed of 2200 rpm is equivalent to a +1 on the Y-axis of FIG. 4.

Since there is no fluid displacement in the variable displacement drive section 14, the bi-directional driven section 18 will not be rotating. As the operator moves a control lever in the vehicle cab to either forward or reverse, the first brake $B_1$ is engaged and the hydromechanical transmission 10 shifts into the creeper range. The creeper range covers both a low forward and a low reverse speed. For the particular gear sizes shown in FIG. 4, the creeper range is from −2.8 to +2.8 mph. The extent of the creeper range as well as the extent of the other three ranges of this hydromechanical transmission 10 is dictated by the number of gear teeth on the various gears of the compound planetary gear set 27. The numerical values for the four different ranges are based on the use of the following size gears: the first sun gear has 27 teeth, the second sun gear has 36 teeth, the third sun gear has 42 teeth and the ring gear has 78 teeth. These specific gear sizes were selected to provide a desired size range but can be changed to accommodate a particular need.

In creeper-forward, the first brake $B_1$ is engaged and the swash plate of the variable displacement drive section 14, which is always rotated clockwise, is tilted for a positive displacement. This positive displacement forces fluid to circulate through the manifold 16 to the bi-directional driven section 18 to cause a clockwise rotation of the bi-directional driven section 18 and the auxiliary shaft 22. The clockwise rotation of the auxiliary shaft 22 rotates the first gear 24 in a clockwise direction. The second gear 26, which meshes with the first gear 24, will then be rotating counterclockwise and will transmit rotational power through the first hollow rotatable shaft 28 to the first planet sun gear 30. The first planet sun gear 30 will therefore be rotating counterclockwise.

With the engagement of the first brake $B_1$, the ring gear 44 is held stationary and serves as a reaction element for the second set of cluster gears 38 through the third planet gears 42. With the ring gear 44 held stationary, the second set of cluster gears 38 will roll around the ring gear 44 causing a clockwise rotation of the rotatable carrier 46 at some reduced speed relative to the speed of the driven input member 11. The output member 48, which is securely attached to the rotatable carrier 46, will then rotate at the same speed as the carrier 46 in the clockwise direction.

For creeper-reverse, the first brake $B_1$ remains engaged but the swash plate of the variable displacement driven section 14 is tilted in the opposite direction from the neutral position. This action causes a negative displacement which causes the fluid to circulate through the hydrostatic drive unit 13 in an opposite or reverse direction. The reverse flow of fluid causes a counterclockwise rotation of both the bi-directional driven section 18 and the auxiliary shaft 22. The counterclockwise rotation of the auxiliary shaft 22 rotates the first gear 24 in a counterclockwise direction. The second gear 26, which meshes with the first gear 24, will then be rotating clockwise and will cause the first sun gear 30 to rotate likewise. This clockwise input to the first planet sun gear 30, together with the braking effect of the first brake $B_1$, will cause the output member 48 to rotate counterclockwise at a reduced speed when compared to the driven input member 11. This counterclockwise rotation of the output member 48 is equivalent to reverse. Note that in FIG. 4, the ring gear 44 is held stationary by the first brake $B_1$, but the line is shown just below the X-axis for clarity and is denoted as 44CR. The 44CR stands for the ring gear 44 in the creeper-reverse mode. Also for creeper-reverse, the first sun gear 30 follows the line denoted as 30CR. For reverse speed, the first sun gear 30 and the ring gear 44 will follow the lines denoted 30R and 44R, respectively. The "R" stands for reverse mode.

Since all of the power for creeper-forward or creeper-reverse is being transmitted to the first sun gear 30 by the hydrostatic drive unit 13, the creeper range is a pure hydrostatic range. As the displacement of the drive section 14 is increased, the speed of the bi-directional driven section 18 is increased and causes an increase in the rotational speed of the output member 48. At maximum displacement of the driven section 14, the first sun gear 30 is driven at 2200 rpm or ±1 on the Y-axis of FIG. 4. It should be noted that in the creeper range the third sun gear 34 is driven at the same speed as the first sun gear 30 but in the opposite direction. This means that at the top end of the creeper range, approximately 2.8 mph, the third sun gear 34 is rotating at the same speed and in the same direction as the driven input member 11, which is 1.0 on the Y-axis.

When this output speed reaches the top end of the creeper range, approximately 2.8 mph, the operator moves the control lever to the working range to disengage the first brake $B_1$ and to engage the first clutch $C_1$.

Engagement of the first clutch $C_1$ causes power to be directly transmitted from the driven input member 11 to the third sun gear 34. Since the third sun gear 34 is rotating at the same speed and in the same direction as the driven input member 11, the first clutch $C_1$ is engaged at zero relative velocity or synchronous speed. As the third sun gear 34 is being mechanically driven by the driven input member 11, the first sun gear 30 is being driven by the hydrostatic drive unit 13. This dual input power path or power splitting feature provides two separate power sources into the compound planetary gear set 27 and is referred to as the hydromechanical drive feature.

Referring again to FIG. 4, it can be seen that the first sun gear 30 is rotating counterclockwise at its maximum speed at the transition point between the creeper-forward range and the working range. Upon entering the working range, the first sun gear 30 is still rotating counterclockwise but at a decreasing rate of speed caused by decreasing the displacement of drive section 14. At the point 0.7 on the X-axis, the first sun gear 30 reverses direction and begins to rotate clockwise. This change in direction is instigated by a change from negative to positive displacement within the variable displacement drive section 14. The first planet sun gear 30 will increase in speed in the clockwise direction until it reaches its maximum clockwise speed or the transition point where the transmission 10 is shifted into the transport range. This point has the coordinates (1,1) in FIG. 4.

Throughout the working range, the third sun gear 34, being coupled to the driven input member 11, is being rotated at a constant speed of approximately 2200 rpm. Therefore, the increase in speed during the working range is supplied by the hydrostatic unit 13. As is evident from FIG. 4, the working range extends from 2.8 to approximately 8 mph. At the 8 mph point, the operator again moves the control lever to enter the higher speed transport range.

At the point where the transport range begins, the first clutch $C_1$ is disengaged and the second clutch $C_2$ is engaged, see FIG. 5. The engagement of the second clutch $C_2$ causes power to be directly transmitted from the driven input member 11 to the second sun gear 32. As can be seen in FIG. 4, the second sun gear 32 is rotating at the same speed and in the same direction as the driven input member 11, 1.0 on the Y-axis, at the point of transition from working to transport ranges. This permits the clutch $C_2$ to be engaged at zero relative velocity or synchronous speed. The second sun gear 32, being coupled to the driven input member 11, is rotated at a constant clockwise speed of 2200 rpm throughout the transport range.

As the second sun gear 32 is being mechanically driven by the driven input member 11, the first sun gear 30 is being hydrostatically driven by the hydrostatic drive unit 13. This dual power path or power splitting input feature provides two separate power paths into the compound planetary gear set 27, similar to that mentioned above for the working range.

Referring again to FIG. 4, it can be seen that the first sun gear 30 is rotating clockwise at 2200 rpm at the transition point between the working range and the transport range. Upon entering the transport range, the first sun gear 30 is still rotating clockwise but at a decreasing rate of speed caused by decreasing the displacement of the drive section 14. At the 1.7 point on the X-axis, the first sun gear 30 reverses direction and begins to rotate counterclockwise. This change in direction is instigated by a change from positive to negative displacement within the variable displacement driven section 14. As is evident from the drawing, the first sun gear 30 continues to rotate counterclockwise, but at an increasing speed, for all further increases in speed.

The reverse range, which is really a high speed reverse, is entered into from the neutral position by the engagement of the second brake $B_2$, see FIG. 5. The engagement of the second brake $B_2$ prevents rotation of the second sun gear 32, denoted by the line marked 32R, so that the second sun gear 32 serves as a reaction element for the first set of cluster gears 36 through the second pinion gear 41. Simultaneously, power from the hydrostatic drive unit 13 is rotating the first sun gear 30 in a clockwise direction. The combined effect of these two different interactions is that the output member 48 will be driven in the counterclockwise or reverse direction as compared to the driven input member 11. For the selected gear sizes used herein, the reverse range extends from zero to −5.0 mph. This is to distinguish it from the creeper-reverse speed. Also in FIG. 4, the line for the second sun gear 32R in the reverse mode is shown slightly above the X-axis for the sake of clarity, when in fact it lies on the X-axis.

It should be noted that with this hydromechanical transmission 10, it is not possible to shift from the creeper-reverse range to the reverse range. In other words, the operator must select, when in neutral, into which reverse range he wishes to place the vehicle.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. An improved full range hydromechanical transmission for connection to a driven input member, comprising:
    (a) a reversible variable speed hydrostatic drive unit connected to said driven input member;
    (b) a compound planetary gear set comprising first, second and third sun gears, a first set of cluster gears, each cluster gear having first and second planet gears with each of said first planet gears meshing with said first sun gear and each of said second planet gears meshing with said second sun gear; a second set of cluster gears with each cluster gear having third and fourth planet gears, each of said fourth planet gears meshing with one of said first planet gears and each of said third planet gears meshing with said third sun gear; a ring gear meshing with said third pinion gears; and a rotatable carrier supporting said first and second sets of cluster gears;
    (c) an output member connected to said rotatable carrier;
    (d) means connecting said hydrostatic drive unit to said first sun gear;
    (e) a first clutch selectively engageable to connect said driven input member to said third sun gear;
    (f) a second clutch selectively engageable to connect said driven input member to said second sun gear;
    (g) a first brake selectively engageable to prevent rotation of said ring gear; and
    (h) a second brake selectively engageable to prevent rotation of said second sun gear.

2. The transmission of claim 1 wherein the first and second planet gears of each cluster gear are coaxially connected and the diameter of said first planet gear is larger than the diameter of said second planet gear.

3. The transmission of claim 1 wherein the third and fourth planet gears of each cluster gear are coaxially connected and the diameter of said fourth planet gear is larger than the diameter of said third planet gear.

4. The transmission of claim 1 wherein said reversible variable speed hydrostatic drive unit includes a variable displacement pump and a bi-directional fixed displacement motor.

5. The transmission of claim 1 wherein said means connecting said hydrostatic drive unit to said first sun gear comprises an auxiliary shaft extending out from said hydrostatic drive unit, a first gear mounted on said auxiliary shaft, and a second gear meshable with said first gear and coaxially connected to said first sun gear.

6. The transmission of claim 1 wherein said first clutch is selectively engageable with a first hub mounted on a rotatable shaft to which said third sun gear is coaxially fixed, said second clutch is selectively engageable with a second hub mounted on a first hollow rotatable shaft which encircles said rotatable shaft and to which said second sun gear is coaxially fixed, and said second brake is selectively engageable with said second hub to prevent rotation of said second sun gear.

7. The transmission of claim 6 wherein said first sun gear and the second gear coaxially connected to the first sun gear are nonrotatably mounted on opposite ends of a second hollow shaft encircling the first hollow shaft.

8. An improved full range hydromechanical transmission for connection to a driven input shaft, comprising:
   (a) a reversible, variable speed, hydrostatic drive unit including:
      (i) a variable displacement drive section connected to and driven by said driven input shaft,
      (ii) a bi-directional fixed displacement driven section, and
      (iii) manifold means interconnecting said variable displacement drive section and said bi-directional fixed displacement driven section for directing a fluid medium therebetween;
   (b) a compound planetary gear set having input and output ends comprising three sun gears coaxially aligned with each other and the input shaft including a first sun gear adjacent the input end, a third sun gear adjacent the output end and a second sun gear between the first and third sun gears; a first set of cluster gears with each cluster gear having a first planet gear and a second planet gear, each of said first planet gears meshing with said first sun gear having a diameter unequal to the diameter of the second planet gears, and each of said second planet gears meshing with said second sun gear; a second set of cluster gears with each cluster gear having a third planet gear and a fourth planet gear, each of said fourth planet gears meshing with one of said first planet gears and each of said third planet gears meshing with said third planet sun gear; a ring gear meshing with said third planet gears; and a rotatable carrier rotatably supporting said first and second sets of cluster gears;
   (c) a rearwardly extending rotatable output shaft securely attached to said rotatable carrier;
   (d) rotatable means connecting said bi-directional fixed displacement driven section to said first sun gear comprising an auxiliary shaft connected to and driven by said bi-directional fixed displacement driven section, a first gear mounted on said auxiliary shaft, and a second gear coaxially attached to said first planet sun gear and meshing with said first gear;
   (e) selectively engageable means for connecting said driven input shaft to said third sun gear;
   (f) selectively engageable means for connecting said driven input shaft to said second sun gear;
   (g) selectively engageable means for preventing rotation of said ring gear; and
   (h) selectively engageable means for preventing rotation of said second sun gear.

9. A transmission for connection to a driven input shaft comprising:
   (a) a reversible variable speed unit driven by said input shaft;
   (b) a compound planetary gear set including:
      (i) a first input member driven by said reversible variable speed unit,
      (ii) a second input member selectively driveable by said input shaft
      (iii) a third input member selectively driveable by said input shaft,
      (iv) an output member,
      (v) a selectively brakeable reaction member,
      (vi) first means acting between said first and second input members and said output member for driving said output member through a high forward speed range when said second input member is driven by said input shaft and said first input member is driven through a range of speeds by said reversible variable speed unit, and
      (vii) second means acting between said first means, said third input member, and said selectively brakeable reaction member for driving said output member through an intermediate forward speed range when said third input member is driven by said input shaft and said first input member is driven through a range of speeds by said reversible variable speed unit and for driving said output member through a low forward and reverse speed range when said selectively brakeable reaction member is braked and said first input member is driven through a range of speeds by said reversible variable speed unit.

10. The transmission of claim 9 further including means for selectively braking said second input member, and wherein said first means acting between said first and second input members and said output member drives said output member through a high reverse speed range greater than but overlapping with the low reverse speed range when said second input member is braked and said first input member is driven through the range of speeds by said reversible variable speed unit.

11. The transmission of claim 10 wherein said reversible variable speed unit is a hydrostatic unit including a pump and a motor, said pump is driven by said input shaft and has a displacement variable from a maximum positive displacement to a maximum negative displacement, and said motor is by-directional and drives said first input member.

12. The transmission of claim 11 wherein said first means includes a compound planetary gear set supported on said output member and having first and second coaxially connected planetary gears in engagement with said first and second input members, respectively, said second means includes a compound planetary gear set carried by said output member and having a third planetary gear acting on said third input member and said selectively brakeable reaction member and a fourth planetary gear acting on said first planetary gear.

13. The transmission of claim 12 wherein said first, second and third input members are axially aligned first, second and third sun gears, respectively.

14. The transmission of claim 13 wherein said selectively brakeable reaction member is a ring gear and said output member is a planetary carrier connected to an output shaft.

15. The transmission of claim 14 wherein said first sun gear is driven by a hydraulic motor of said reversible variable speed drive unit through an auxiliary drive system including a shaft driven by said hydraulic motor positioned parallel to and offset from said input shaft, a first gear mounted on said shaft driven by said hydraulic motor, and a second gear meshing with said first gear and being coaxially connected to said first sun gear.

* * * * *